United States Patent
Ahlqvist

Patent Number: 6,069,003
Date of Patent: May 30, 2000

[54] PROCESS AND DEVICE IN SO-CALLED BIOFILTERS, AND DEVICE FOR MOISTENING SAME

[76] Inventor: Stein G. Ahlqvist, Kolmardsvagen 23, S-181 64 Lidingo, Sweden

[21] Appl. No.: 09/171,132

[22] PCT Filed: Apr. 10, 1997

[86] PCT No.: PCT/SE97/00611

§ 371 Date: Oct. 13, 1998

§ 102(e) Date: Oct. 13, 1998

[87] PCT Pub. No.: WO97/37748

PCT Pub. Date: Oct. 16, 1997

[30] Foreign Application Priority Data

Apr. 11, 1996 [SE] Sweden .................................. 9601375
Dec. 6, 1996 [SE] Sweden .................................. 9604510

[51] Int. Cl.[7] .............................................. C12S 5/00
[52] U.S. Cl. ..................... 435/266; 435/286.1; 435/286.5; 435/297.1; 422/122; 95/1; 210/500.27
[58] Field of Search .................................. 422/120, 122; 435/262, 262.5, 266, 286.1, 286.5, 297.1; 95/1; 210/500.27

[56] References Cited

U.S. PATENT DOCUMENTS 5,618,730 4/1997 Eder et al. ............................ 435/289.1

FOREIGN PATENT DOCUMENTS 4017388 12/1991 Germany.

OTHER PUBLICATIONS

Abstract of JP, A, 1-274825, Nov. 2, 1989.

*Primary Examiner*—David A. Redding
*Attorney, Agent, or Firm*—Young & Thompson

[57] ABSTRACT

Process and device for so-called biofilters, in which polluted gas, e.g. air, is made to pass through, and thereby be cleaned in a bed of bed media arranged in a container, comprising measuring the moisture content of the bed and the supply of fluid, e.g. water, in order to maintain the desired moisture content, wherein the moisture content of the bed is measured by elements (9; 23, 23') which are not in contact with the bed media.

27 Claims, 3 Drawing Sheets

6,069,003

PROCESS AND DEVICE IN SO-CALLED BIOFILTERS, AND DEVICE FOR MOISTENING SAME

FIELD OF THE INVENTION

The present invention relates to a process in so-called biofilters, in which contaminated gas, e.g. air, is made to pass through and is thereby cleaned in a bed of bed media arranged in a container, comprising the measuring of the moistness of the bed and the supply of fluid, e.g. water, in order to maintain a desired moistness.

The invention also relates to a device for performing the process.

Moreover, the invention relates to a device for moistening the bed media.

BACKGROUND OF THE INVENTION

Techniques of the type mentioned above are previously known. In such known techniques the measuring of the moistness, i.e. the specific fluid content of the bed, is a big problem. Measuring based on measuring the conductivity by means of electrodes introduced into the bed is sensitive to disturbances, unstable and thereby extraordinary difficult to calibrate, amongst others because of oxidation of the measuring electrodes. Measuring based on capacitive measurements is not suitable for water-saturated substances.

SUMMARY OF THE INVENTION

The present invention relates to a technique which solves the above mentioned problems and permits an exact measuring of the average moistness of the bed.

Consequently the invention relates to a method for determining the moisture content of a bed of bed media in a biofilter in which polluted gas is passed through the media arranged in a closed container. The method is specially characterized by the step of determining changes in the weight of the container.

The invention refers further to a device for controlling the moisture content of bed media in a bed in a biofilter comprising a bed of bed media arranged in a closed container. The device is especially characterized by means for measuring the weight of the container.

BRIEF DESCRIPTION OF THE DRAWINGS

The invention is described more closely below in association with examples of embodiments and with the appended drawings, where.

DETAILED DESCRIPTION OF THE INVENTION

For the sake of simplicity, similar parts of the different embodiments shown in the figures have the same reference numbers.

Figure 1:
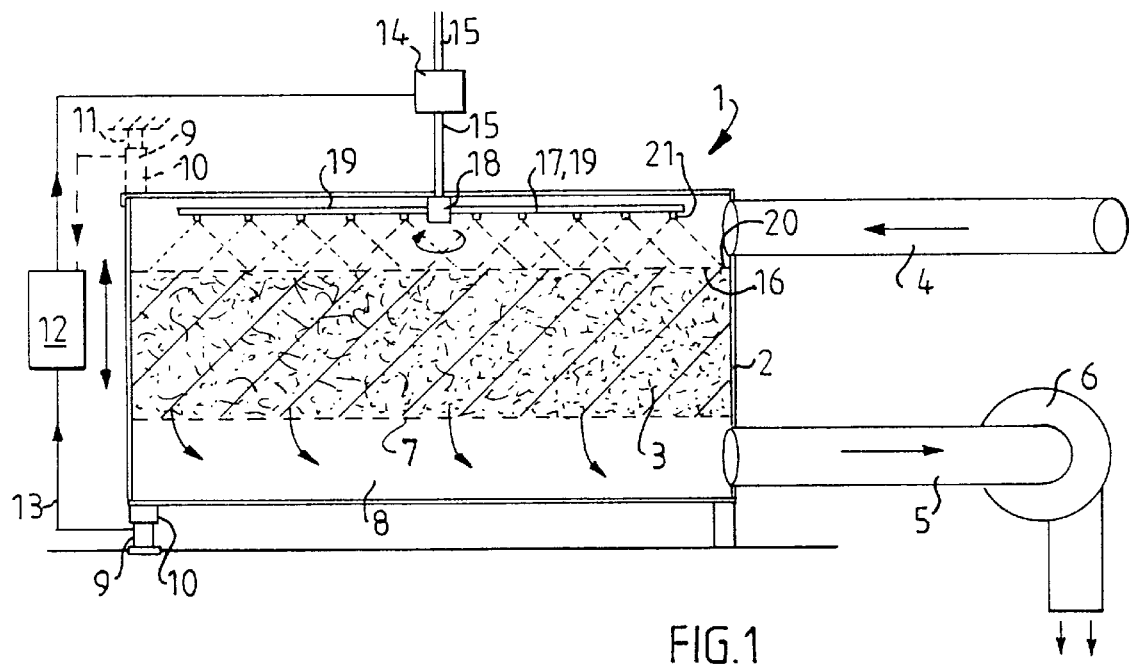
FIG. 1 shows schematically a vertical, central section through a biofilter according to a first embodiment of a device according to the invention.
Figure 2:
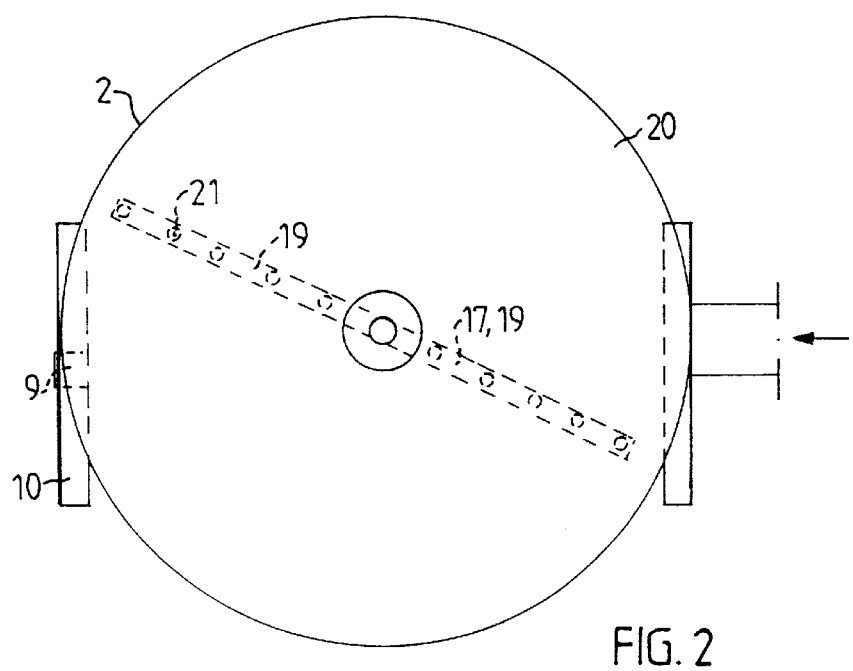
FIG. 2 shows the filter according to FIG. 1 seen from above in FIG. 1.

In FIG. 1 a so-called biofilter with reference numeral 1 comprises a bed 3 of bed media comprising microorganisms which can break down pollutants arranged in an essentially closed container 2. The bed is intended to be supplied, preferably from above, via inlet 4 with polluted gas, e.g. usually air, which it is intended will pass through, and thereby be cleaned, in the bed and leave the container, cleaned, via the outlet 5. According to the embodiment shown there is an air flow forcing means 6 to suck the gas through the bed. Moreover, according to the embodiment shown, the bed is supported on a grid arrangement 7 which leaves a free space 8 under the bed in the container.

A weight-sensing means 9, for example comprising a force-sensing strain-gauge arrangement or load cell of a known type, is arranged in connection to a support element 10 for the container, whereby the bed in its entirety together with the container is intended to be weighed to determine the average moisture of the bed, i.e. the average fluid content of the bed. Normally the fluid is mainly water. According to an alternative embodiment, weight-sensing means 9 are connected to a suspension element 11 for the container, such as shown dashed in FIG. 1. Combinations of both these alternatives are also conceivable. Weight-sensing means 9 can also be arranged at more than one support element/ suspension element of the container. The means 9 are consequently intended to sense, measure, a force exerted through the weight of the bed and the container. This force can be measured indirectly, for example by measuring a change in the height of a reference position on the container.

A control unit 12 is arranged to be continuously or intermittently supplied with signals 13 from said weight-sensing means, which signals comprise weight readings, actual values, and, from a desired value concerning the weight of the bed, to influence means 14 for regulation of the supply of fluid to the bed for regulating the moisture content of the bed to a predetermined value. The means 14 comprise, for example, a magnetic valve arranged to open and close the fluid supply via a pipe 15.

The container has preferably an essentially circular horizontal cross-section and in this connection preferably has essentially the shape of a standing cylinder, wherein the bed has an essentially circular horizontal upper surface 16. A moisturizer 17, which is rotatable around the central part 18 relative to the bed and arranged above the upper surface of the bed, is arranged to sweep over the upper surface of the bed for supplying fluid to said upper surface. According to the preferred embodiment shown there is at least one essentially radially or diametrically extending moisturising arm 19, rotatable around said central part relative to the bed, arranged to supply essentially equally large quantities of fluid per unit area of the upper surface of the bed over essentially the whole of the upper surface, whereby the quantity of fluid released per time unit increases in the radial direction of the upper surface of the bed towards the periphery 20 of the bed. The arm 19 comprises one or a number of outlet nozzles 21 for fluid which consequently are arranged essentially in the radial direction of the bed, whereby the outlet capacity of the nozzles and/or the number of nozzles per unit length in said direction increases towards the periphery of the bed. To avoid over-watering the container 2 can be equipped with means which prevent fluid flow if the weight of the container 2 exceeds a desired value.

The process and function of the device according to the invention should essentially be obvious from that stated above.

The invention offers considerable advantages compared with the prior art. An exact and reliable measure of the average moisture content of the bed is achieved by weighing the whole of the bed. By means of the desired moisturizer an even moisture content over the horizontal cross-section of the bed is achieved, wherein the average moisture content determined through the weight can also give an accurate measure of the local moisture content in the bed if the bed media is equally moist over the whole of its volume.

However it is possible that, for example if a malfunction occurs in a nozzle, the average humidity of the bed media is within desired limits while simultaneously the bed media is partly too dry (forming dry pockets) and partly too wet (forming wet pockets). If the bed media in a dry pocket becomes too dry then the micro-organisms die and unfiltered air can pass through the dry pocket. If the bed media is too wet then the micro-organisms digest the pollutants at a reduced rate.

The airflow speed and hence volume through the bed media varies as the humidity of the bed media varies. The airflow speed is inversely proportional to the humidity of the bed media, i.e. the dryer the bed media the higher the airflow. If a dry pocket occurs in the bed media the airflow speed through the dry pocket increases. As the resistance to the airflow of the dry pocket is less than that of the rest of the bed media even more air will pass through the air pocket, further drying it out. This is a positive feedback effect which tends to accelerate the increase in the size of the dry pocket and can quickly destroy the functioning of the filter.

In accordance with other embodiments of the invention a biofilter is provided with means for measuring the humidity of the bed media in different parts of the bed. This can be done directly by providing one or more moving or fixed sensors which directly or indirectly provide a measure of the humidity near, or in, the bed media. It can be achieved by providing comparing means for comparing the actual airflow speed or volume (i.e. airflow speed per projected unit area) through part of the bed media in the filter with a desired airflow speed or volume and means for regulating the supply of water to the parts of the bed media in which the actual airflow speed differs from the desired airflow speed. The comparing means comprises one or more sensors which are preferably placed near to but not in contact with the bed media so the airflow through the bed media adjacent to the sensor can be sensed and the humidity of the adjacent bed media determined.

For the sake of brevity the embodiments described refer only to sensing methods for sensing the airflow speed as it is obvious for the man skilled in the art how to adapt the described embodiments to measure airflow volume, for example by mounting sensors in a tube or cavity of known cross-sectional area. Furthermore means for directly measuring the humidity can be used instead of airflow sensors.

Figure 3:
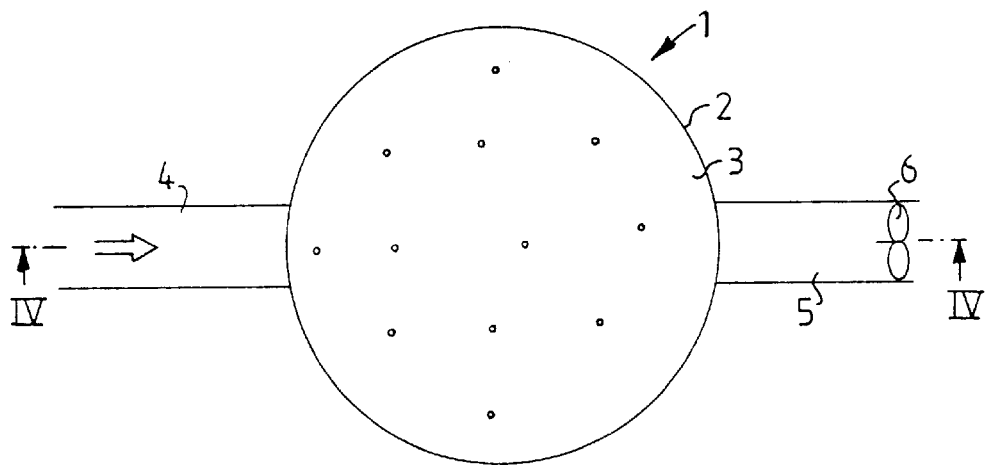
FIG. 3 is a plan view showing a cross-section along line III—III in FIG. 4 of a second embodiment of a biofilter in accordance with the invention.

FIG. 3 shows a biofilter 1 in which the airflow through the container 2 is ensured by air flow forcing means 6 in the form of, for example, a suction fan mounted on the outlet means 5 although any other suitable means for producing natural or forced airflow can conceivably be used. Although the airflow in this embodiment is from the top of the container to the bottom of the container it is of course possible for it to be in the opposite, or any other, suitable direction. The airflow volume per time unit through the container is preferably controlled so as to be substantially constant. Alternatively the airflow volume through the container can be measured and used, for example, to calculate an average actual airflow speed or volume value for the bed media. This average can be used to calculate or adjust a desired airflow speed or volume value.

Figure 4:
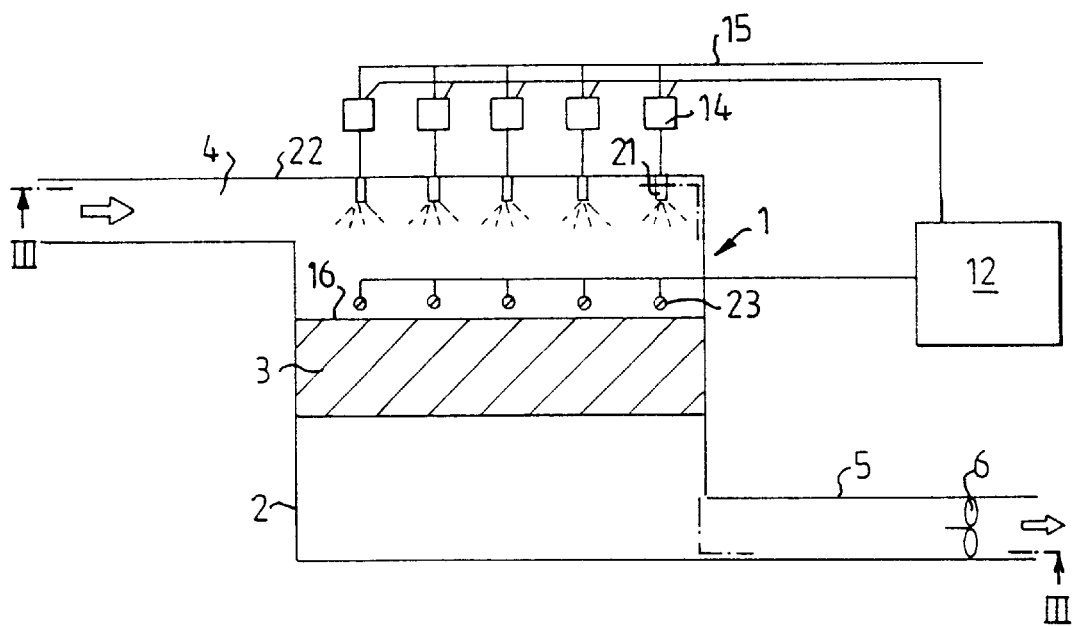
FIG. 4 is a longitudinal cross-sectional view along line IV—IV in FIG. 3.

As shown in FIG. 4, a number of fluid distributing means 21, shown in the following example in the form of nozzles 21 but which could be any suitable orifice, are mounted on the upper surface 22 of container 2. Naturally the nozzles can be placed in any suitable position, for example under the bed 3, depending on the design of the container and the direction of the airflow through it. Each nozzle is connected by remote controlled valve means 14 to a fluid supply pipe 15. The remote controlled valve means 14 can be a magnetic valve or the like. The fluid supply pipe 15 is preferably connected to a clean water supply although if desirable the fluid supply could be water mixed with nutrients or biodegradable pollutants. As before, the flow of fluid through each valve means 14 is controlled by control means 12. In this embodiment of the invention a number of sensors 23 are arranged above the surface 16 of the bed media with each sensor 23 being placed directly below a nozzle 21. If necessary the sensors 23 may be provided with shields (not shown) to prevent the nozzles 21 spraying directly onto them. It is also conceivable that sensors 23 can be arranged under bed 3 but in this case special arrangements may be necessary to keep them clean. Furthermore the sensors 23 could be arranged in, preferably stable, cavities formed in the bed media 3. Sensors 23 directly or indirectly measure the airflow speed (or volume) through the bed media in the vicinity of the sensor 23. The sensors 23 can be, for example, anemometers of the hot-wire or cup or propeller type, or moving plate sensors, or laser, or other, Doppler sensors, or pitot-static systems, high accuracy thermometers (which can compare the temperature above and below the bed media to estimate the change in kinetic energy of the air flowing the bed media and hence its change in velocity) or any other suitable sensor. Sensors 23 are connected to control means 12 which compares the airflow speed sensed by each sensor 23 against a pre-set, preferably variable desired airflow speed value. As the airflow through each part of the container 2 depends partly on the shape of the container 2 it is desirable that the desired airflow speed value for each sensor 23 can be individually pre-set. However, for the sake of simplicity it is also possible to have the same desired airflow speed value for all of the sensors. If the actual airflow speed sensed by a sensor 23 is greater than the desired airflow speed value for the same sensor 23 the control means 12 causes the valve means 14 above the sensor 23 in question to open for a pre-set time interval or until a predetermined volume of fluid has been released. This causes fluid to be sprayed from the nozzle 21 onto the bed media 3 in the vicinity of the sensor 23 in question. This increases the humidity of the bed media 3 and lowers the airflow speed through it. In order to prevent too much fluid being sprayed onto the bed media the sensor 23 in question can be inactivated for a short period of time to allow the fluid to evenly wet the bed media 3 before the next comparison is made and the procedure repeated. Comparisons can of course be made continuously or at pre-set or adjustable intervals as necessary.

Figure 5:
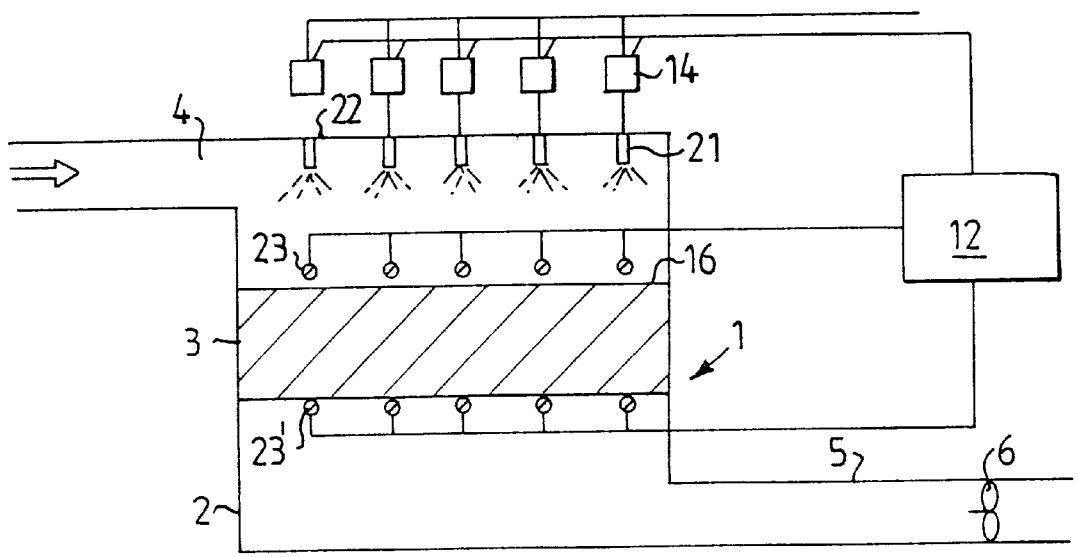
FIG. 5 is a longitudinal cross-sectional view of a third embodiment of a biofilter in accordance with the invention.

FIG. 5 shows an embodiment in which the pressure difference, temperature difference or humidity difference across the bed media 3 is used to indirectly monitor the speed of the airflow through the bed media 3. A number of sensors 23, 23' are arranged in pairs above and below the bed media 3. In this example the sensors, 23,23' are assumed to be pressure transducers which measure the ambient air pressure however it is possible to use the same or similar principles with temperature or humidity sensors. Each sensor 23 is positioned substantially vertically above its corresponding sensor 23' and vertically below a nozzle 21. The difference in the pressure measured by a sensor 23 above the bed 3 and the pressure measured by a sensor 23' below the bed 3 is inversely proportional to the speed in the airflow through the bed media in the region of the sensor. In other words if the bed media is dry then its resistance to airflow is low so the air pressure on opposite sides of the bed media are close. The actual difference in pressure for each pair of sensors is monitored by control means 12. When the control means detects that the actual difference pressure for a pair of sensors, 23,23' is less than a pre-set, preferably variable, limit value, it commands the valve 14 above the sensors 23,23' to open for a pre-set, preferably variable, time. This causes water to be released onto the area of the bed media 3 in the vicinity of the sensors 23, 23' in question which raises the humidity of the bed media 3. As mentioned above the sensors 23, 23' in question can be deactivated to allow the fluid to evenly wet the bed media 3 before the next comparison is made.

Figure 6:
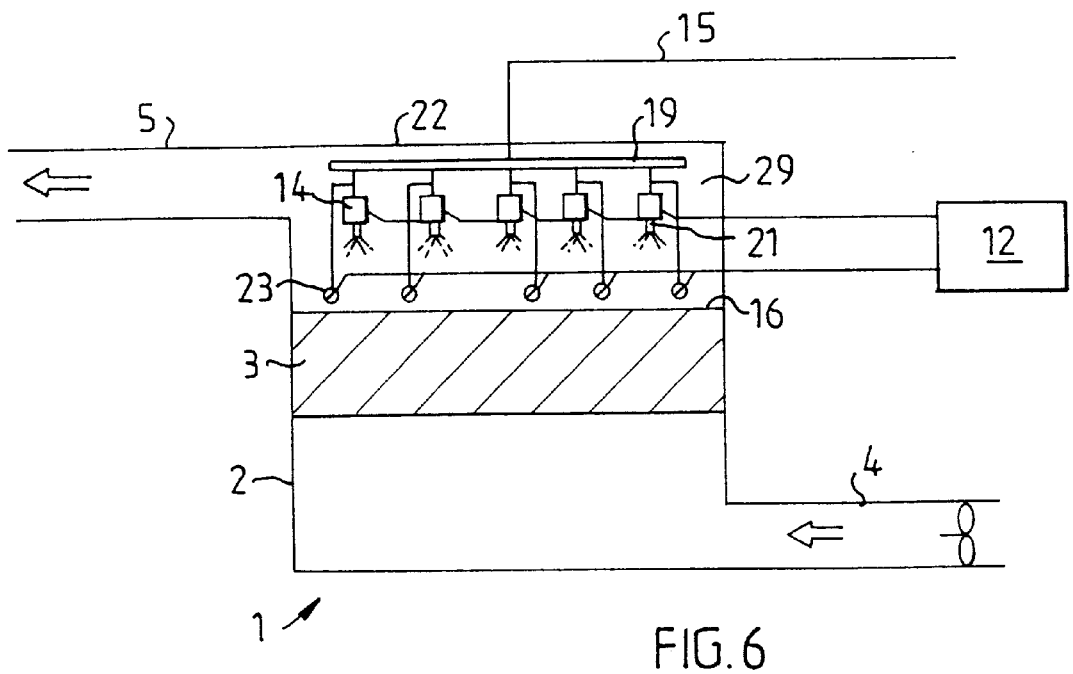
FIG. 6 shows a longitudinal cross-section of a fourth embodiment of a biofilter in accordance with the invention.

FIG. 6 shows an embodiment of a monitory means according to the invention which can be retro-fitted on existing biofilters. In this embodiment an existing biofilter 1 comprises a substantially fluid-tight container 2 containing a bed 3 of bed media. The container 2 is intended to be supplied with polluted air or gas via inlet means 4. The polluted air or gas is cleaned by passing through bed 3 and is blown into container 2 via air flow forcing means 6. A rotatable arm 19 with a plurality of nozzles 21 is rotatably mounted in the upper surface 22 of container 2. Each nozzle 21 has an associated remote controlled valve means 14 which is connected to fluid supply pipe 15 and operable by control means 12. Each nozzle also has an associated sensor means 23 attached to arm 19 at a height just above the upper surface 16 of the bed media. During use arm 19 rotates continuously and using the principles described above the airflow speed near the surface of the bed media is sensed and the bed media wetted as required. Depending on the speed that the sensors 23 react to changes in airflow speed and the rotational speed of the arm 19, the nozzles 21 can be positioned a distance behind the sensors 23 in the direction of rotation of the arm 19 so that the correct part of the bed media 3 is wetted. It is also conceivable that arm 19 rotates intermittently instead of continuously.

In another embodiment of the invention, not shown, one or more nozzles and one or more sensors are provided on the rotating arm. They are movably mounted on the arm so that as the arm rotates they move along the length of the arm and trace a spiral pattern. The slower the speed that the nozzle and sensor move along the arm, the tighter the coils of the spiral and hence a more exact measurement of the humidity of the bed media can be obtained.

The invention is not limited to the examples described above but includes also embodiments in which combinations of fixed and movable nozzles and/or fixed and movable sensors are used. Furthermore each sensor could have an associated range of desired airflow speeds, the opening time of the associated valve being depending on which, if any, of the desired values is passed.

The invention has been described above in connection to the embodiments. Naturally, many embodiments and small changes and complements can be conceived without leaving the essential inventive idea.

Consequently, any other horizontal cross-section than a circular one can be conceivable for the container/bed, e.g. polygonal, irregular, rectangular or square. In some of these cases, the moisturizer of the, earlier described, rotating type may be less suitable as the corner parts of the bed surface cannot easily be given the same specific fluid supply as the other parts. For such container cross-sections other types of movably arranged moisturizer arrangements can be conceived in order to produce a homogeneous specific fluid supply over the upper surface of the bed. Consequently, an oscillatable ramp with at least one or more nozzles can be used, wherein the oscillating movement and the placing of the nozzles and the direction of the outlet are adapted so that the specific fluid supply will be homogeneous over the surface of the bed. An arm which is movable back and forth along the surface of the bed is also conceivable.

The monitoring means can also be provided on the same arm or an arm which can move straight across the container. The monitoring means can consist of one or more movable nozzles or sensors which can move transversely back and forth along the arm as it moves straight across the container. Alternatively one or more fixed nozzles can be mounted on the arm.

Processes are also conceivable where the gas is pressed through the bed by means of a pressure fan arrangement. Gas and fluid can furthermore be supplied to the undersurface of the bed instead of to the upper surface.

A number of different embodiments can be conceived concerning the weight-measuring means, e.g. pneumatic, hydraulic, optical or other arrangements in order to detect the weight of the bed at which fluid should be supplied resp. the supply should stop.

The moisturizer can be moved, e.g. rotated, by driving means. The drive can also be achieved by means of reaction forces through the existing nozzles being inclined.

The invention shall consequently not be considered to be limited to the above mentioned embodiments but also can be varied within the scope of the appended claims.

What is claimed is:

1. Method for determining the moisture content of a bed media in a biofilter, which comprises:

passing polluted gas through the bed of bed media arranged in a closed container; and determining changes in the weight of said closed container.

2. The method according to claim 1, further comprising providing weight-sensing means arranged on at least one of a support element and a suspension element for said closed container.

3. The method according to claim 1, further comprising continuously supplying measuring readings, actual values, to a control unit; comparing said actual values to a desired value concerning the weight of said container; and, supplying fluid to the bed when said actual values fall below said desired value.

4. The method according to claim 1, further comprising supplying fluid to an upper surface of the bed by at least one movably arranged moisturizer, wherein said upper surface of the bed is supplied with essentially equal quantities of fluid per unit area over essentially the whole supper surface of the bed.

5. The method according to claim 1, wherein the bed has an essentially horizontal, circular upper surface, the method further comprising supplying fluid to the circular upper surface of the bed by a moisturizer which rotates around a central part and sweeps over said upper surface.

6. The method according to claim 1, further comprising measuring directly or indirectly the actual moisture content of part of the bed media; comparing said actual moisture content against at least one desired moisture content value for said part of the bed media; and distributing fluid to said part of the bed media when the actual value of the moisture content of said part of the bed media is less than said desired value.

7. The method according to claim 1, wherein said polluted gas is air, the method further comprising measuring directly or indirectly at least one of the actual airflow speed and volume through part of the bed media; comparing said actual airflow speed or volume against a desired airflow speed or volume for said part of the bed media; and distributing fluid to said part of the bed media when the actual value of the airflow speed or volume through said part of the bed media is greater than desired airflow speed or volume value.

8. The method according to claim 7, further comprising stopping for a pre-set period of time the measurement of the actual airflow speed or volume for said part of the bed media after fluid has been distributed to the bed media.

9. Device for controlling the moisture content of bed media in a bed in a biofilter comprising a bed of bed media arrange din a closed container, and means for measuring the weight of said closed container.

10. The device according to claim 9, wherein said means are operatively associated with at least one of supporting elements and suspension elements for said closed container.

11. The device according to claim 9, further comprising a control unit structured and arranged a) to continually be supplied with weight readings, actual values, and b) from a desired value concerning the weight of the container, to control fluid supply means to the bed in order to regulate the weight of the container towards said desired value.

12. The device according to claim 9, wherein said container has an essentially circular, horizontal cross-section, and wherein the bed has an essentially circular, horizontal upper surface.

13. The device according to claim 9, further comprising at least one movably arranged moisturizer structured and arranged to supply the upper surface of the bed with essentially the same quantity of fluid per unit area over essentially the whole of the upper surface of the bed.

14. The device according to claim 9, further comprising a moisturizer, structured and arranged a) to rotate about a central part relative to the bed, and b) to sweep over the upper surface of the bed in order to supply fluid to said upper surface.

15. The device according to claim 9, further comprising at least one essentially radially or diametrically extending, moving, moisturizing arm rotatable around a central part relative to said bed, structured and arranged to supply essentially equal quantities of fluid per unit area of the upper surface of the bed over essentially the whole upper surface, whereby the quantity of fluid supplied per unit time increases in the radial direction of the upper surface of the bed towards the periphery of the bed.

16. The device according to claim 15, further comprising at least one outlet nozzle for fluid arranged in the radial direction relative to said arm, and the outlet capacity of said at least one nozzle or the number of nozzles per unit length in said radial direction increases towards the periphery of the bed.

17. The device according to claim 9, further comprising means for supplying fluid to at least one of the upper surface and undersurface of the bed in order to maintain a desired moisture content in the bed, including at least one movable arranged moisturizer structured and arranged to supply the upper surface or undersurface of the bed with essentially the same quantity of fluid per unit area over essentially the whole upper surface or undersurface of the bed.

18. The device according to claim 9, wherein said closed container has an essentially circular, horizontal cross-section, in the shape of a standing cylinder, the bed having an essentially circular, horizontal surface, said device further comprising a moisturizer rotatable around a central part relative to the bed and arranged to supply water to at least one of the upper surface of the bed by sweeping thereover and the lower surface of the bed by sweeping thereunder.

19. The device according to claim 9, further comprising at least one moisturizer arm rotatable around a central part relative to the bed for supplying essentially equal quantities of fluid per unit area of a surface of the bed over essentially the whole surface, wherein the quantity of fluid released per time unit increases in a radial direction in the surface of the bed towards the periphery of the bed.

20. The device according to claim 9, further comprising sensing means for directly or indirectly sensing the actual value of the moisture content of the bed media; control means structured and arranged a) to compare said actual value of the moisture content against at least one desired value; and b) to cause valve means operatively associated with said fluid supply means to open when the actual value of the moisture content of said part of the bed media is less than a desired value.

21. The device according to claim 9, further comprising sensing means for directly or indirectly sensing the actual value of at least one of the airflow speed and volume through part of the bed media; control means structured and arranged a) to compare said actual value of the airflow speed or volume against at least one desired value; and b) to cause valve means operatively associated with said supply means to open when the actual value of the airflow speed or volume through said part of the bed media is greater than a desired value.

22. The device according to claim 21, wherein said sensing means is an anemometer.

23. The device according to claim 21, wherein said sensing means comprise a pair of pressure transducers arranged vertically spaced on opposite sides of said bed.

24. The device according to claim 21, wherein said sensing means are fixedly mounted in said container.

25. The device according to claim 21, wherein said sensing means are movably mounted in said container.

26. The device according to claim 21, comprising a plurality of fluid distribution means and a plurality of sensing means.

27. The device according to claim 21, wherein said sensing means are not in contact with the bed media.

* * * * *